United States Patent [19]

O'Bryon

[11] Patent Number: 5,152,310
[45] Date of Patent: Oct. 6, 1992

[54] IN-LINE VALVE FOR FLUID CONDUIT

[76] Inventor: Philip J. O'Bryon, 216 W. Mill St., St. Rte. 604, West Salem, Ohio 44287

[21] Appl. No.: 843,209

[22] Filed: Feb. 28, 1992

[51] Int. Cl.$^5$ .................... F16K 43/00; F16L 55/128; B23B 41/08
[52] U.S. Cl. ..................... 137/15; 137/318; 138/89; 138/94; 138/97; 408/87
[58] Field of Search ............... 137/15, 315, 318, 321; 138/89, 93, 94, 94.3, 97; 408/87, 92, 99, 101, 102

[56] References Cited

U.S. PATENT DOCUMENTS

| | | | |
|---|---|---|---|
| 2,763,282 | 9/1956 | Reedy et al. | 137/318 |
| 2,899,983 | 8/1959 | Farris | 137/318 |
| 3,120,246 | 2/1964 | Alter | 138/94 |
| 3,532,113 | 10/1970 | McKean | 137/318 |
| 3,687,166 | 8/1972 | Herrin | 137/318 |
| 3,863,667 | 2/1975 | Ward | 137/318 |
| 4,127,141 | 11/1978 | Ledonne et al. | 137/318 |
| 4,205,697 | 6/1980 | Gebelius | 137/318 |
| 4,239,055 | 12/1980 | Van Coffman | 137/315 |
| 4,552,170 | 11/1985 | Margrave | 137/318 |
| 4,628,955 | 12/1986 | Smith | 137/318 |

*Primary Examiner*—George L. Walton
*Attorney, Agent, or Firm*—Michael Sand Co.

[57] ABSTRACT

An in-line valve for mounting within an existing fluid line to temporarily block the flow of fluid downstream from the valve without interrupting the flow of fluid upstream of the valve. Two valve half bodies create a cylindrical aperture therebetween which is complementary to the conduit when securely mounted thereon. Extending through the center of each valve half body is an aperture generally orthogonal to, and passing through, the first aperture. An annular shaft extends through the second aperture which has at least two outer diameters with a shoulder presented at the point of diametric change. Encircling at least a portion of the main shaft is an annular flexible seal with one end abutting the shoulder allowing the smaller diameter of the main shaft to extend therethrough. The cutter abuts the flexible seal such that the seal is interposed between the larger diameter of the main shaft and the cutter. The draw bars opposite end has a hex nut threadably engaging the draw bar such that when the hex nut is tightened, the cutter is pulled toward the main shaft, thereby decreasing the distance between the shoulder of the main shaft, and the cutter, which applies a force against the flexible seal thereby expanding the seal within the conduit, and sealing it. The invention also pertains to the method of blocking the flow of fluid through a conduit without first interrupting the flow of fluid therethrough.

16 Claims, 7 Drawing Sheets

IN-LINE VALVE FOR FLUID CONDUIT

BACKGROUND OF THE INVENTION

1. Technical Field

The invention relates to an in-line valve adapted to be installed into an existing fluid line without first stopping the flow of fluid through the line and to a method of accomplishing the same. More particularly, the present invention relates to an in-line valve which will remove two circular portions from a fluid conduit to allow a valve stem to travel therethrough, expand, and block all flow through the conduit.

2. Background Information

Due to budget constraints or to the particular construction and layout of a fluid system within a commercial or industrial building or complex, shutoff valves are not always placed in each line that branches from a main fluid line. Inasmuch as it is not practical for the entire flow system to be shut down in order to effect repairs on a single system branch, or to shut down the entire system to effect repairs on the end of a fluid conduit, it becomes necessary to isolate only that portion to be repaired. In this manner, only that portion of the building serviced by the conduit under repair will be inconvenienced rather than the entire structure. To accomplish this isolation, a valve was required that could be installed into an existing fluid line without first shutting off the flow of fluid through the line so that the flow of fluid is only stopped downstream of the valve without any interruption of the fluid flow upstream of the installed valve.

Existing in-line valves have been developed which perform generally satisfactorily in that they can be mounted in an existing fluid line and provide a shutoff therefor without interrupting any flow upstream of the valve. However, these known valves do present some problems which detract from the ease and feasibility of installation. Specifically, the closest known prior art valve to that of the present invention includes a single rigid solid shaft with a cutter being loosely mounted at the end thereof, in combination with an expandable elastomeric sealing sleeve mounted on the shaft adjacent the cutter. The loose mounting of the cutter on the end of the shaft was necessary to enable the cutter to push against the flexible sleeve and expand it outwardly to preclude fluid flow through the conduit after the cutter cut through the conduit. However, the looseness of the cutter would allow the cutter to sway from its axial orientation with respect to its mounting shaft as it cut through the conduit, and begin cutting in a direction that differed from the axis of the shaft. As such, the aperture that is cut through the conduit may be irregularly shaped creating an area where leakage could occur. Also, a more drastic result occasionally occurred in that the cutter would actually cut through the side of the valve body creating weakness, and possible failure within the valve body itself.

Secondly, as the cutter cut through the conduit, a constant pressure would remain on the expandable sleeve seal thereby weakening the seal, as well as making the cutting process itself more difficult. Furthermore, the teeth of the cutter of such prior art valves would bend inward around the removed metal parts of the conduit after contacting a hardened steel ring, thereby making the removal of the removed metal discs difficult or impossible. The teeth curling is a result of the two following design problems. First, the end-play or loose mounting of the cutter on the shaft causes the teeth to constantly score the inner wall of the valve body forcing the teeth inward. Secondly, the valve is turned until a hardened steel split ring, recessed within the valve body wall, is struck by the cutter teeth. When the teeth contact this harder material, they turn inward thereby trapping the removed metal discs. This trapped removed metal presents a blockage problem especially when the valve is used to create a T-joint, rather than simply to add a shutoff valve in an existing conduit. In either situation, the removed metal portions or discs must be removed from the valve so that when the valve is opened to allow fluid to travel back through the conduit, the removed metal does not work loose and become trapped thereby blocking the conduit.

Thus, despite the existence of the above discussed prior art valve, the need exists for an in-line valve in which the cutter is firmly mounted on the end of the shaft as it cuts through an existing conduit without effecting the subsequent outward expansion of a seal mounted on the shaft for temporarily blocking the flow of fluid through the valve.

SUMMARY OF THE INVENTION

It is therefore an objective of the present invention to provide an improved in-line valve which can be mounted quickly and easily into an existing fluid conduit to temporarily block the flow of fluid through the line without leaking.

A further objective of the present invention is to provide such an in-line valve which has a cutter rigidly mounted on the end of the main valve shaft so that the cutter will create a smooth circular cut in the conduit as it advances therethrough.

It is still a further objective of the present invention to provide a valve which will not apply a pressure upon the flexible sealing member when cutting through the conduit.

Yet another objective of the invention is to assure that the material removed from the pipe can be removed from the cutter so as to prevent pipe blockage regardless of whether the valve is used to create a T-joint or to provide a temporary shutoff valve.

A still further objective of the invention is to provide such an in-line valve which may be installed with common hex and ratchet wrenches.

Yet another objective of the present invention is to provide such an in-line valve which has a relatively simple construction, which achieves the stated objectives in a simple, effective, and inexpensive manner and which solves problems and satisfies needs in the art.

These and other objectives and advantages of the invention are obtained by the in-line valve of the present invention, the general nature of which may be stated as including a valve body having a pair of body sections forming a first aperture therethrough when said body sections are joined together for receiving the conduit therein; a second aperture formed in the valve body and extending generally orthogonal to said first aperture; a shaft having a hollow bore movably mounted in the second aperture; a flexible seal mounted on an inner end of the shaft; a draw bar movably mounted within the bore of the shaft; a cutter mounted on an inner end of the draw bar for cutting a pair of diametrically opposite holes in the conduit; means mounted on an outer end of the shaft and draw bar for advancing the shaft and draw bar along the second aperture toward the conduit and then for rotating the cutter to cut the opposed holes in the conduit and for advancing the seal through said holes; and means for expanding the seal within the conduit to block the flow of fluid therethrough.

These objectives are further obtained by the method of the invention, the general nature of which is a method for blocking the flow of fluid through a conduit including the steps of providing a valve body having a pair of half body sections, a shaft movable within the valve body, a draw bar movably mounted within a hollow bore of the shaft having a cutter mounted on an inner end thereof, and a flexible sealing sleeve mounted between the cutter and a intermediate portion of the shaft; clamping the half body sections about a section of conduit; advancing the shaft and draw bar in unison along the valve body until the cutter cuts a pair of diametrically opposed holes in the conduit and the flexible sealing sleeve extends through and beyond said pair of holes; and retracting the draw bar within the bore of the shaft to expand the sealing sleeve outwardly into the conduit to block the flow of fluid therethrough.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 3A is an enlarged sectional view taken on line 3A—3A of FIG. 3, depicting the main shaft, draw bar, and cutter interaction;

FIG. 5 is a view similar to FIGS. 3 and 4 showing the in-line valve with the elastomeric seal in an expanded sealing position within the conduit;

Similar numerals refer to similar parts throughout the drawings.

DESCRIPTION OF THE PREFERRED EMBODIMENT

Figure 1:
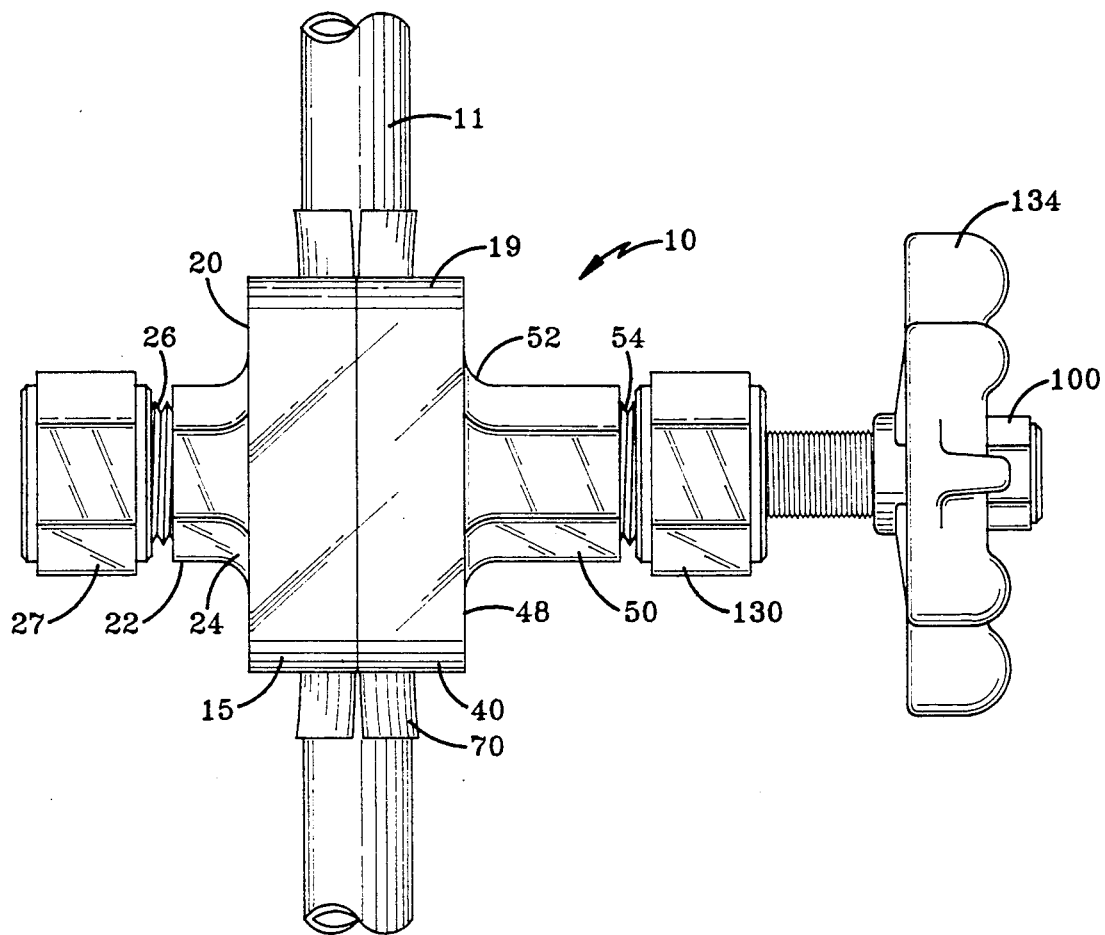
FIG. 1 is an elevational view showing the in-line valve of the invention mounted on a section of conduit.

The in-line valve of the present invention is designated generally as 10, and is shown particularly in FIG. 1 in operative association with a conduit 11. Conduit may be of any convenient diameter or manufactured out of various materials without departing from the spirit of the present invention. For most applications, conduit 11 will be plastic, aluminum or copper.

Figure 2:
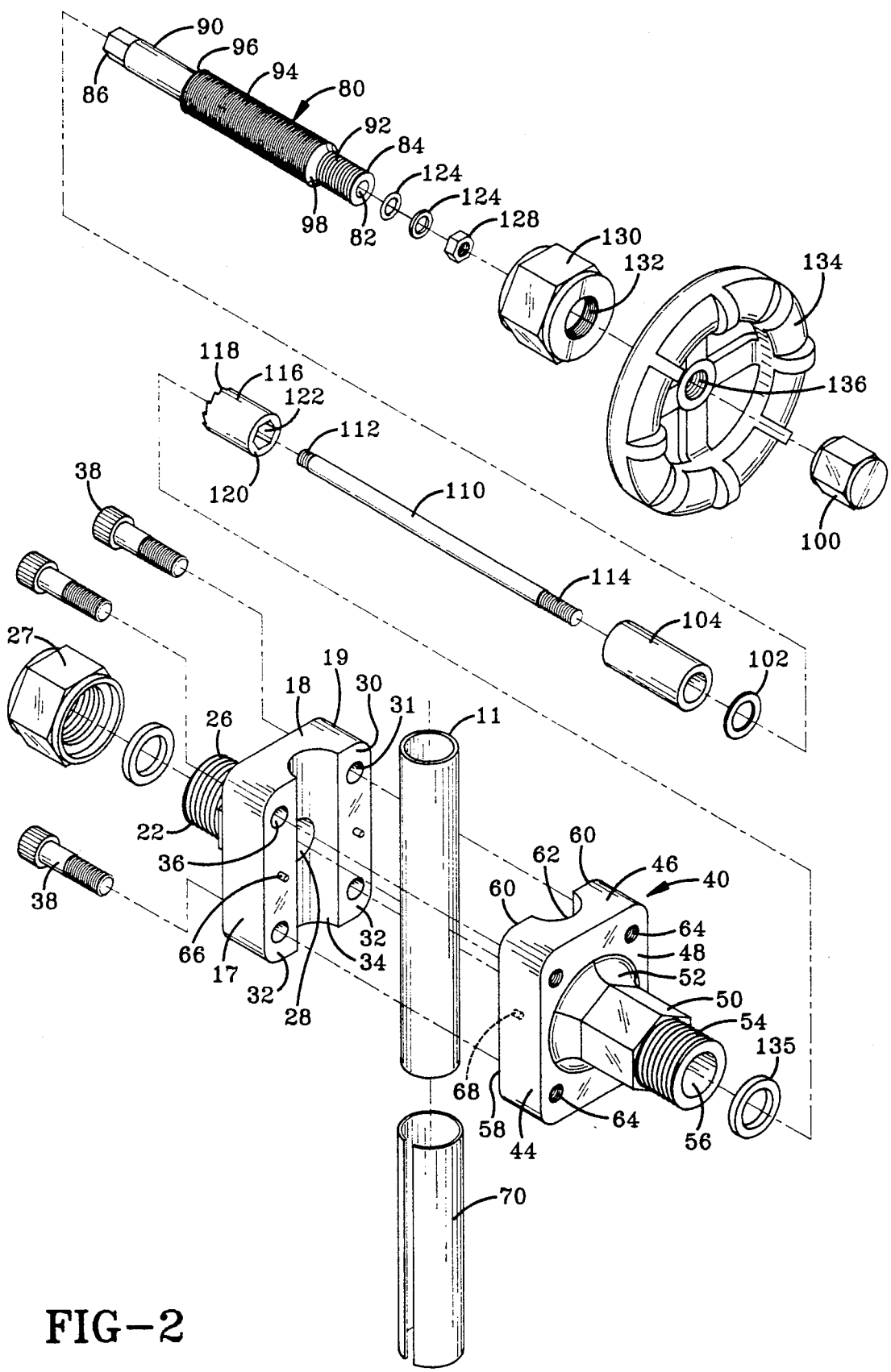
FIG. 2 is an exploded perspective view of the inline valve of FIG. 1.

Referring then to FIG. 1 and to the exploded assembly drawing of FIG. 2, valve 10 includes two half body sections 15 and 40. Body section 15 has a substantially rectangular cross section with a pair of parallel sides 17 connected by two ends 18 that are substantially orthogonal to sides 17 by rounded corners 19. If desired, ends 18 and sides 17 may have an arcuate configuration without departing from the spirit of the present invention. Section 15 has an outer surface 20 with a perimeter conterminous with sides 17 and ends 18. Extending from the center of half body 15 is a boss 22 which joins with surface 20 by fillet 24. Boss 22 has a threaded outer end 26 for the mounting of an end cap 27 thereon, the purpose of which become more apparent hereinbelow. An aperture 28 extends through boss 22 and through the center of valve half body 15.

Body section 15 further includes a mating interior surface 30 which has a perimeter defined by ends 18 and sides 17 and lies in a plane substantially parallel to outer surface 20. Interior surface 30 presents two substantially planar faces 32 separated by a semicircular recess 34 complementary to one half the cross section of conduit 11 adapted to be interposed therebetween, and communicates with aperture 28 as shown in FIG. 2. A hole 36 extends through each corner of body section 15 for the acceptance of mounting hardware therethrough, such as bolts 38.

Half body section 40 is generally similar to first valve half body 15 and is generally rectangular defined by two parallel sides 44, and two ends 46 orthogonal to sides 44. Section 40 also has an outer surface 48 from which extends a boss 50 that connects with surface 48 by a fillet 52. Boss 50 is longer axially than boss 22 and has a threaded outer end 54. Boss 50 is annular in cross section with an internal aperture 56 which extends through the center of section 40. Body section 40 further includes a mating interior surface 58, similar to surface 30, which is defined by two planar portions 60 separated by a semicircular recess 62 which is equal to one half the cross section of conduit 11 as is recess 34. Extending through each corner of body section 40 is a hole 64 which aligns with holes 36 of body section 15 for the acceptance of bolts 38 therethrough for securing the two half body sections together.

As is shown in FIG. 2, interior faces 30 have two locating pins 66 protruding therefrom which fit into complementarily shaped locating notches 68 milled into interior face 58 of valve half body 40 when the body sections are joined together.

When body sections 15 and 40 are mated about conduit 11, opposing recesses 34 and 62 will encircle a portion of conduit 11. Circumferentially interposed between conduit 11 and the mating valve sections 15 and 40, is a split seal 70 formed of a flexible sealing material. More particularly, split seal 70 encircles that portion of conduit 11 which is positioned between valve sections 15 and 40 and will create a fluid tight seal along the cylindrical mating surface between conduit 11 and sections 15 and 40.

To secure the in-line valve assembly onto conduit 11, bolts 38 are slid through aligned holes 36 and threadably engage mounting holes 64 of valve body section 40 thereby forcing interior surfaces 30 and 58 into conterminous relation about conduit 11. In the preferred embodiment, mounting hardware 38 comprises four fine pitch hex bolts. However, any convenient mounting apparatus may be employed without departing from the spirit of the present invention.

A valve shaft indicated generally at 80, extends into aperture 56 of annular boss 50 and preferably has an annular cross section of varying outer diameter and has a constant diameter hollow bore 82 extending axially throughout the length thereof (FIGS. 3-6). Shaft 80 has an annular valve end 84 and a hexagonal cutter end 86. Shaft 80 further includes a reduced diameter smooth cylindrical portion 90 adjacent cutter end 86 and forms an annular shoulder 96 with a finely threaded portion 94. Threaded portion 94 merges into a reduced diameter coarsely threaded end portion 92 by a conical shoulder 98.

A washer 102 is telescopically mounted on smooth portion 90 of shaft 80 and abuts against shoulder 96. A cylindrical shaped flexible elastomeric sleeve or seal 104 is telescopically mounted on shaft portion 90 and is in abutting relationship with washer 102. Seal 104 extends throughout the length of smooth portion 90 of shaft 80 and partially along a portion of hexagonal cutter end 86.

A draw bar 110 having an outer diameter substantially equal to the inner diameter of bore 82, extends axially through shaft 80. A cylindrical cutter indicated generally at 116, is mounted on a threaded first end 112 of draw bar 110 by engagement in a threaded hole 123 of an inner wall 113 extending transversely with respect to hexagonal opening 122. Cutter teeth 118 are integrally milled into a first end of cutter cylinder 116. Opposite end 120 of cutter cylinder 116 has a flat annular outer surface which clamps sealing sleeve 104 against washer 102 of shaft 80. End 120 of cutter cylinder 116 has an aperture 122 which is complementary to hexagonal end 86 of shaft 80 such that when cutter 116 is placed upon shaft 80, end 86 will fit snugly within aperture 122 as shown particularly in FIG. 3A, preventing cutter 116 from rotating apart from main shaft 80.

Figure 7:
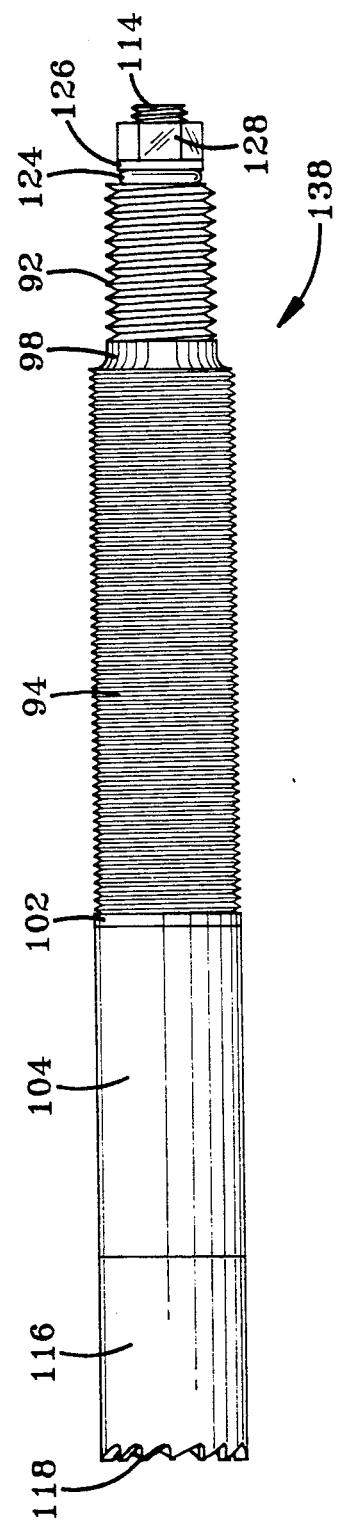
FIG. 7 is a side elevational view of the cutter and draw bar assembly removed from the valve of FIGS. 1-5.

Draw bar 110 is positioned within bore 82 of main shaft 80 such that a second threaded end 114 thereof extends outwardly beyond course thread 92 as shown particularly in FIG. 7. Once draw bar 110 and main shaft 80 are assembled, an O-ring 124 and a washer 126 are placed over end 114 of draw bar 110 and are drawn against the end of shaft 80 by a hex tightening nut 128 which pulls cutter cylinder 116 towards seal 104, and clamps the seal against washer 102. This valve stem assembly is shown in FIG. 7 and indicated generally at 138.

A valve cap 130 (FIGS. 3-6) having a threaded aperture 132 is threaded onto fine pitch threads 94 of shaft 80, and has a threaded inner diameter surface 133 engageable with threaded portion 54 of boss 50 for securing cap 130 on body section 40. A sealing washer 135 preferably is placed within end cap 130 and seals against the end of threaded boss 50 and sleeve seal 104.

A valve handle 134 has a central threaded aperture 136 and is advanced along threaded end 92 of shaft 80 until it abuts conical shoulder 98. An internally threaded control cap 100 is threaded onto portion 92 of shaft 80 such that it envelopes end 114 of draw bar 110 including O-ring 124, washer 126 and hex nut 128. Rotation of handle 134 then advances shaft 80 and draw bar 110 along aperture 56 of body section 40 until cutter 116 is adjacent semicircular recess 62 thereof as shown in FIG. 3.

Figure 3:
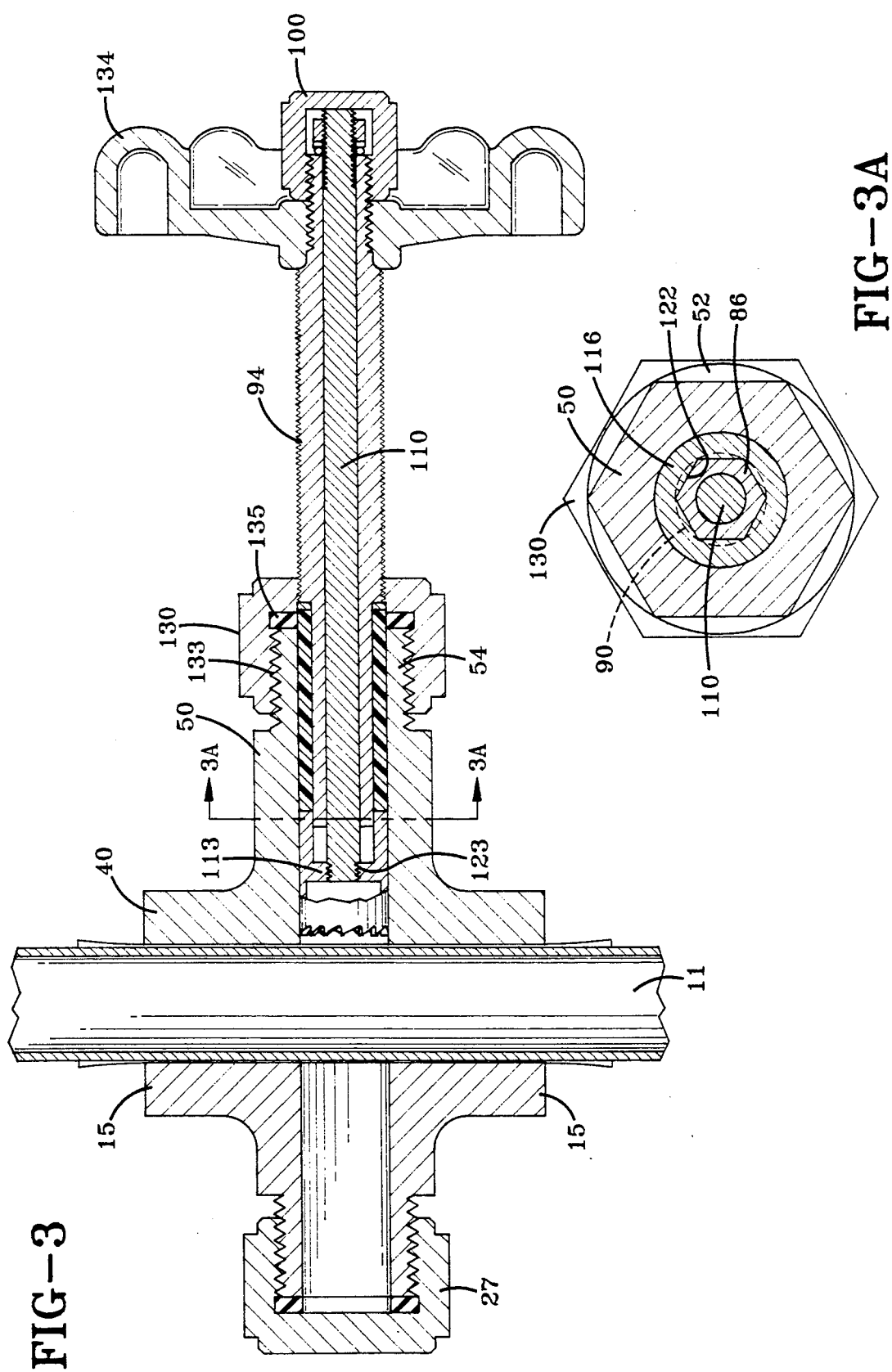
FIG. 3 is an enlarged sectional view showing the in-line valve on a section of conduit prior to cutting through the conduit.
Figure 4:
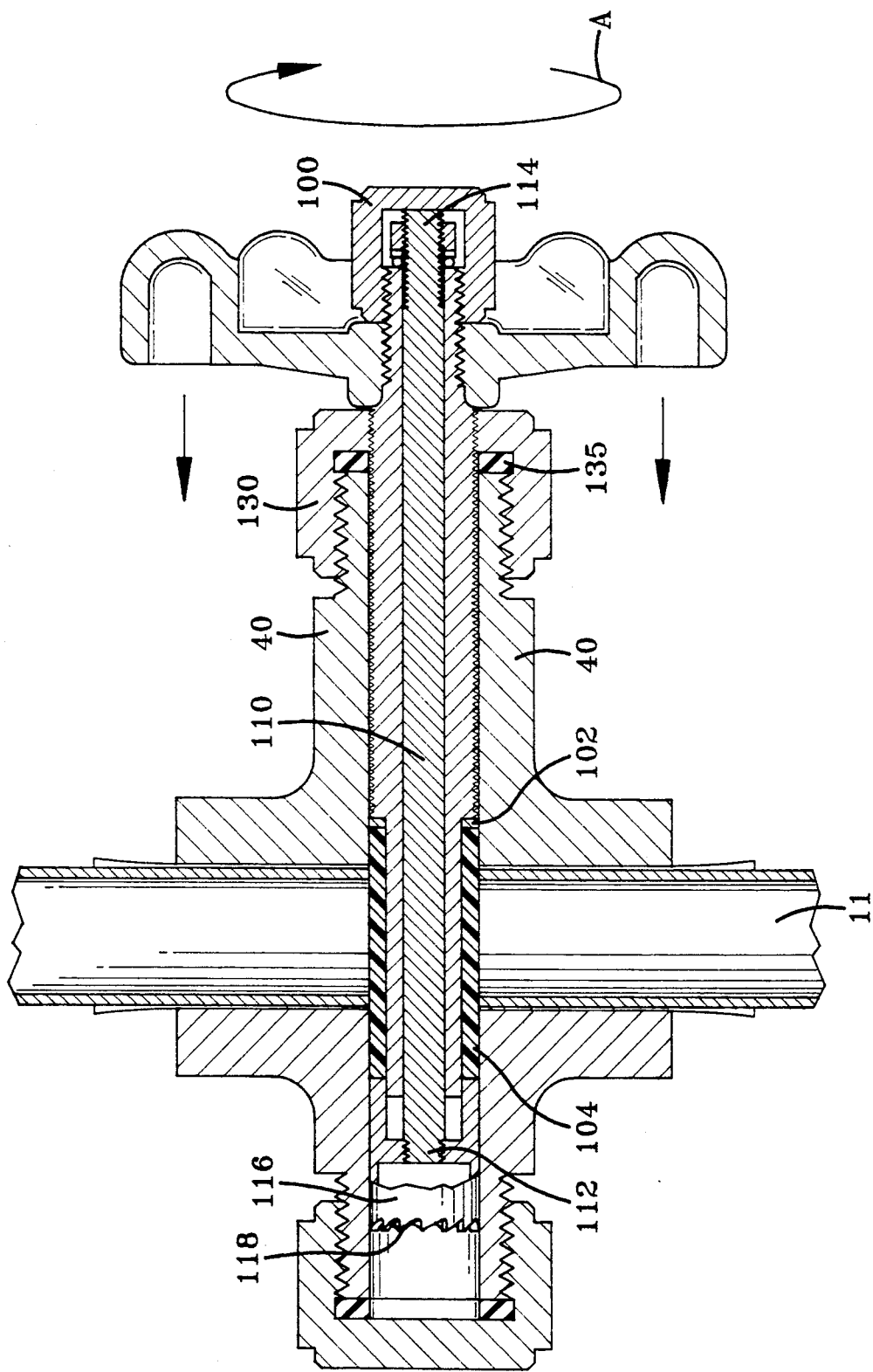
FIG. 4 is a sectional view similar to FIG. 3, showing the in-line valve after cutting through the conduit and prior to sealing the same.

The operation of the above described in-line fluid valve is best understood by referring to FIGS. 3-7. After the two body sections are clamped tightly about a section of conduit 11 by bolts 38 after placing split sealing sleeve 70 thereon as shown in FIG. 1, cutter 116 is advanced to a start position as shown in FIG. 3. Thereafter, handle 134 will be rotated in the clockwise direction as shown by arrow A in FIG. 4 advancing the entire valve stem assembly 138 along boss 50 until cutter 116 contacts conduit due to the engagement of fine threads 94 within threaded aperture 132 of valve cap 130. Once contacted, a wrench (not shown) will be used to torque control cap 100 thereby forcing cutter teeth 118 of cutter 116 into conduit 11. Continued rotation of handle 134 will rotate cutter teeth 118 through conduit 11 removing two disc shaped sections of material (not shown) from the conduit until handle 134 engages valve cap 130 as shown in FIG. 4.

It is noted that through the entire cutting process, there is no pressure exerted on seal 104. As is evident in FIGS. 3-6, threaded end 114 of draw bar 110 abuts the inner surface of control cap 100. As such, as control cap 100 is torqued downward, a separate constant pressure is applied to both shaft 80 and draw bar 110. More particularly, control cap 100 applies a pressure which forces shaft 80 toward, and through conduit 11, merely by the operative threading interaction of threaded aperture 132 of valve cap 30, and fine threaded portion 94 of shaft 80. In this manner, shaft 80 acts as a guide for cutter 116, as the actual force upon cutter 116 is applied directly through draw bar 110 and not along the shaft. The length of draw bar 110 is such that when control cap 100 is seated firmly onto main shaft 80 and cutter 116 is firmly threaded onto end 112 of draw bar 110, the cutter will apply no appreciable force to seal 104. Preferably, the distance between seal 104 and cutter 116 will be 2/1000 of an inch when the cutter progresses toward and through conduit 11. As no pressure is applied to seal 104, the actual cutting process will be simpler as there is no outward pressure against the valve body by seal 104. Moreover, seal 104 suffers less damage as a result of the cutting process.

After completing the conduit cutting of FIG. 4, control cap 100 is removed as shown particularly in FIG. 5, exposing draw bar hex nut 128. Draw bar hex nut 128 then is rotated clockwise as shown by arrow C, moving draw bar 110 in the direction of arrow D within bore 82 of shaft 80 as threaded end 114 of draw bar 110 moves through nut 128. In this manner, cutter 116 is pulled back toward conduit 11 and hexagonal end 86 of shaft 80 will advance further into hexagonal aperture 122 of cutter 116. This action will then cause end surface 120 of cutter 116 to press against seal 104. As draw bar hex nut 128 continues to be rotated, the area between surface 120 of cutter 116 and shoulder 96 of shaft 80 will be decreased until that distance is smaller than the unstressed length of the seal 104. Seal 104 then, being the weakest member of the three compressing members, is forced to expand outwardly and create a bulbous portion 160 within conduit 11. This bulbous portion 160 will continue to expand into pressure engagement with the inner walls of conduit 11 thereby stopping all flow of fluid through the conduit. In this manner, the entire flow will be halted, and work may commence downstream from valve 10.

Figure 8:
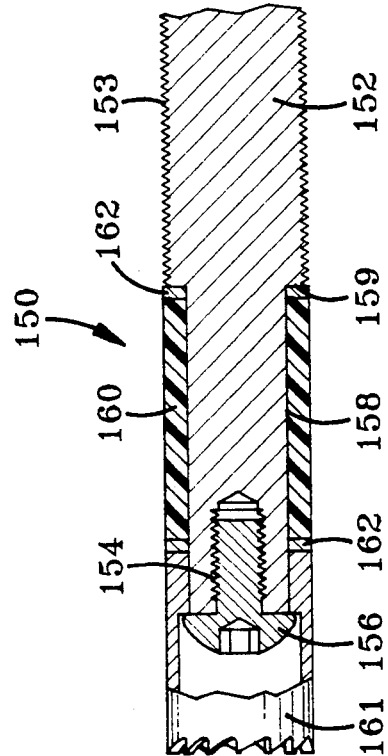
FIG. 8 is a fragmentary sectional view showing the mounting of a rotary cutter on a cutter bar in combination with the elastomeric seal of a prior art in-line valve.

Referring then to FIG. 8, there is pictured a prior art in-line valve assembly including a portion of a prior art cutter bar assembly 150. Assembly 150 has a solid shaft 152 having a threaded end recess 154 for receiving a large head screw 156. Shaft 152 has a reduced diameter area 158 joined to an enlarged threaded area 153 by an annular shoulder 159. A cutter 161 is loosely mounted on the end of shaft 152 by screw 156 and loosely mounts a sealing sleeve 160 between a pair of washers 162 on shaft area 158. However, a problem arises in that the cutter is quite loose, and can become misaligned with the axis of shaft 152 increasing the difficulty of the cutting process, occasionally causing the cutter to cut into the valve body. Moreover, when cutting with the prior art cutter bar assembly 150, a constant pressure remains on seal 160 as the force from the main shaft 152 is transmitted to cutter 161 directly through seal 160 keeping the seal in constant compression which is avoided by valve 10 of the present invention.

Figure 6:
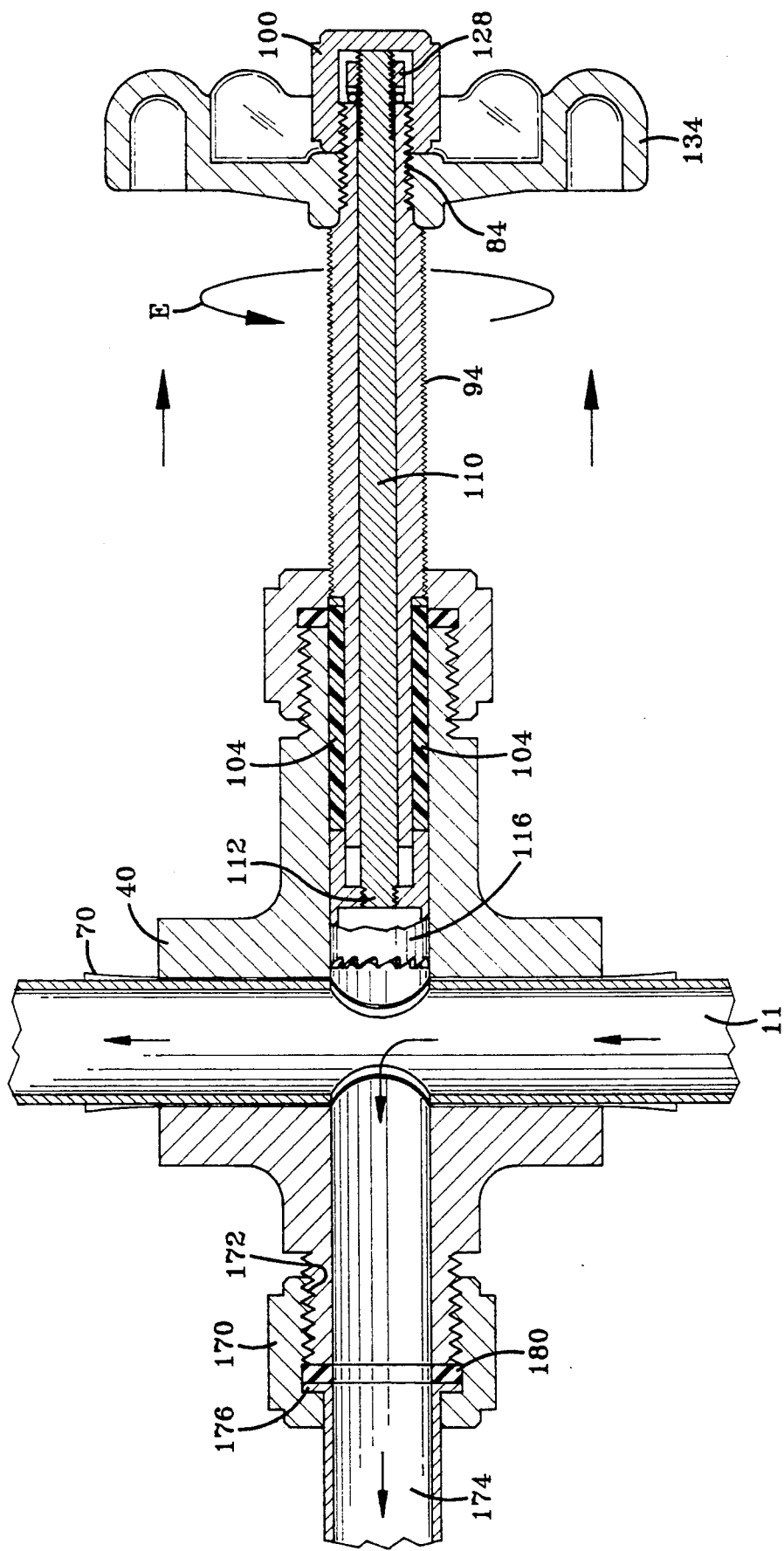
FIG. 6 is a sectional view similar to FIGS. 3-5 showing the valve in an open position and with a T-branch conduit connected to the main conduit on which the valve is installed.
Figure 6:
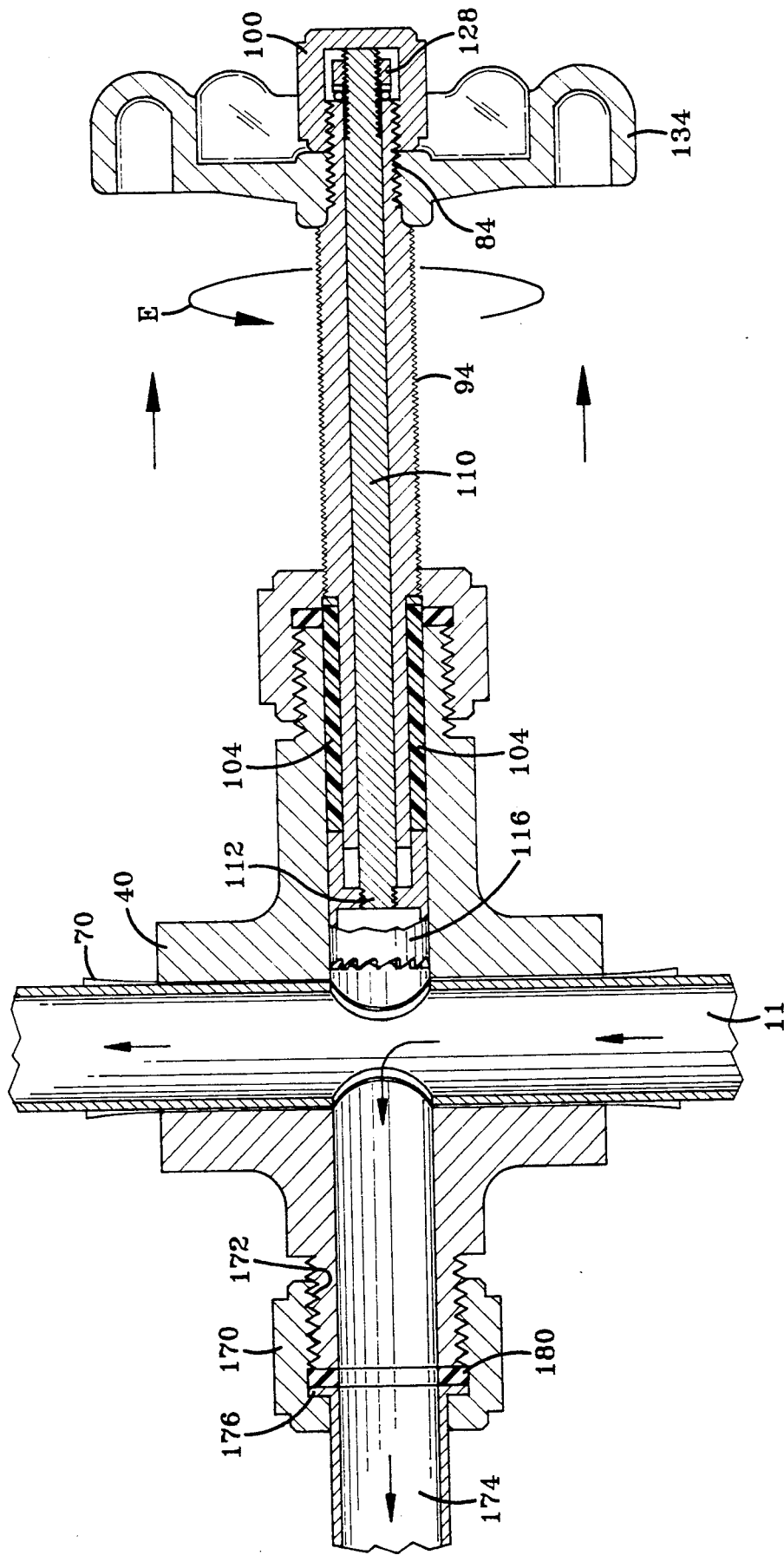

After the repair or other maintenance has been performed downstream of valve 10, hex nut 128 is turned until it reaches the top of draw bar 110. The draw bar is then gently tapped and pushed down until it touches the top of shaft 80. Control cap 100 is reinstalled whereby the inner top surface thereof will press on hex nut 128 and lock the cutter in a full open position which allows seal 104 to resume its original cylindrical configuration since all pressure is removed therefrom. Handle 134 then is rotated counter clockwise as shown by arrow E as shown in FIG. 6 moving cutter 116 and seal 104 to a retracted position permitting the flow of fluid through the conduit. Prior to this retraction of cutter 116 and seal 104, end cap 27 is removed enabling the two severed discs of conduit to be removed preventing any possible blockage of the conduit.

Referring again to FIG. 7, a modified embodiment of the present invention is shown wherein the valve of the present invention is employed to create a branch line, from the main conduit which is commonly referred to as a T-joint. End cap 27 is replaced with a cap 170 formed with an aperture 172 in the center thereof. A conduit 174 having an end flange 176 extending through aperture 172 and is sealed by an elastomeric washer or ring 180 clamped between flange 176 and the annular edge of threaded portion 26 of boss 22. Once branch conduit 174 is installed, the in-line valve assembly is operated exactly as was described above moving seal 160 from its sealing position of FIG. 5 to the retracted position of FIG. 6.

Accordingly, the in-line valve assembly is simplified, provides an effective, safe, inexpensive, and efficient device and method which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved in-line valve assembly is constructed and used, the characteristics of the construction, and the advantages, new and useful results obtained; and new and useful structures, devices, elements, arrangements, parts and combinations, and method steps are set forth in the appended claims.

I claim:

1. An in-line valve for mounting on a existing fluid conduit for temporarily blocking the blow of fluid through said conduit, said valve including:
    a) a valve body having a pair of body sections forming a first aperture therethrough when said body sections are joined together about said conduit;
    b) a second aperture formed in the valve body and extending generally orthogonal to said first aperture;
    c) a shaft formed with a hollow bore and having inner and outer ends and an intermediate portion, movably mounted in the second aperture;
    d) a draw bar having inner and outer ends movably mounted for axial sliding movement within the bore of the shaft, with the inner end of the draw bar extending beyond the inner end of the shaft;
    e) a cutter firmly mounted on the inner end of the draw bar and slidably non rotatably engaged with the inner end of the shaft for cutting a pair of diametrically opposite holes in the conduit;
    f) a flexible seal having a first end in abutting relationship with the cutter and a second end in abutting relationship with the intermediate portion of the shaft;
    g) means for advancing the shaft and draw bar along the second aperture toward the conduit and then for rotating the cutter to cut opposed holes in the conduit and for advancing the seal into said holes;
    h) retention means engageable between the outer end of the shaft and the outer end of the draw bar to enable the draw bar and shaft to rotate and advance as a unit axially along the second aperture when cutting the opposed holes in the conduit and when advancing the seal into said holes thereby preventing pressure from being applied to the flexible seal while at the same time preventing said draw bar from retracting prematurely in said shaft and prematurely expanding the seal during the cutting of said holes until the cutter reaches a stop position, at which position no force is exerted on a bottom surface of said cutter; and
    i) seal expansion means engageable with the outer end of the draw bar for axially retracting the draw bar in the shaft to move the cutter of the shaft after release of the retention means, for compressing a portion of the seal between its first and second ends between the cutter and said intermediate portion of the shaft for expanding a portion of the seal between its first and second ends outwardly within the conduit without applying pressure on the bottom surface of the cutter, to block the flow of fluid through the conduit.

2. The valve defined in claim 1 in which the means for advancing the shaft and draw bar along the second aperture includes an end cap mounted on one of the body sections having a threaded aperture formed therein; and in which the shaft has a fine threaded portion engaged in the threaded aperture of the end cap for advancement of the shaft toward the conduit.

3. The valve defined in claim 2 wherein said cutter and said flexible seal present substantially the same outer diameter as the fine threaded portion of said shaft.

4. The valve defined in claim 1 in which the outer end of the shaft has a course threaded portion; and in which an end cap and handle are mounted on said course threaded portion of the shaft, with said end cap being engageable with the outer end of the draw bar to provide the retention means to prevent premature retraction of said draw bar as the shaft and draw bar are advanced toward the conduit.

5. The valve defined in claim 1 in which the seal expansion means includes a nut mounted on a threaded portion of the outer end of the draw bar whereupon rotation of said nut in a first direction retracts said draw bar with respect to the shaft to expand the seal outwardly within the conduit.

6. The valve defined in claim 5 in which a sealing ring is telescopically mounted on the outer end of the draw bar and is pressed against the outer end of the shaft by the nut to provide a fluid seal between the shaft and draw bar.

7. The valve defined in claim 1 in which the seal is telescopically mounted on the shaft and is trapped between a top end of the cutter and the intermediate portion of said shaft; in which the cutter has an aperture formed in the top end thereof; and in which the inner end of the shaft is slidably non rotatably mounted within the cutter aperture permitting sliding movement of the cutter along said shaft to expand the flexible seal outwardly into the conduit.

8. The valve as defined in claim 1 wherein the retention means includes a valve cap body which envelopes and abuts the outer end of said draw bard thereby locking it in place precluding premature movement of said cutter along said shaft.

9. The valve as defined in claim 1 wherein said inner end of the shaft has a non circular cross section; and in which the cutter has an aperture complementarily related to said non circular cross section of said shaft so as to prevent rotation therebetween when said shaft is inserted into the aperture of the cutter.

10. The valve as defined in claim 1 wherein at least two locating pins extend from a mating surface on one of the valve body sections and is engaged in complementarily related recesses formed in a mating surface of the other body section when the two body sections are connected together.

11. The valve as defined in claim 1 wherein a split elastomeric sleeve is fitted about said conduit such that when the pair of body sections are connected, said split seal encircles the conduit between the said body sections.

12. The valve as defined in claim 1 wherein a plurality of equally spaced threaded fasteners join the body sections together about the conduit.

13. The valve as defined in claim 1 further comprising a removable end cap threadably engaged with one of the body sections providing means to remove portions cut from the conduit after cutting the holes in said conduit.

14. A method for blocking the flow of fluid through a conduit including the steps of:
providing a valve body having a pair of body sections, a shaft having inner and outer ends movable within the valve body, a draw bar having inner and outer ends movably mounted within a hollow bore of the shaft and with the inner end of the draw bar extending beyond the inner end of said shaft and having a cutter rigidly mounted on the inner end thereof being in a sliding nonrotational relationship with the inner end of the shaft, and having a flexible sealing sleeve with first and second ends mounted between the cutter and an intermediate portion of the shaft;
clamping the body sections about a section of conduit;
providing means for securing the shaft and draw bar together to form a unitary assembly;
advancing the shaft and draw bar assembly in unison into the valve body and cutting opposed holes in the conduit and advancing the sleeve into said holes whereby the ends of the sleeve are external of the conduit and an intermediate portion is located within the conduit without applying pressure to the sleeve while at the same time preventing the draw bar from retracting prematurely in the shaft and prematurely expanding the sleeve during the cutting of the holes until the cutter reaches a stop position, at which position no force is exerted on a bottom surface of the cutter
unsecuring the shaft from the draw bar after the cutter has reached the stop position to permit independent movement therebetween; and
retracting the draw bar within the bore of the shaft to compress the seal between the intermediate portion of the shaft and the cutter to expand a portion of the sealing sleeve between its first and second ends outwardly into the conduit to block the flow of fluid therethrough without applying pressure onto the bottom surface of the cutter.

15. The method as defined in claim 14 including the steps of removing an end cap from a threaded aperture formed on one of the valve body sections to provide access to the interior of the valve body; removing two discs of material from within the valve body which were cut from the conduit when cutting the pair of opposed holes therein; and installing a branch conduit in the threaded aperture after removal of two discs.

16. The method defined in claim 14 including the step of advancing the draw bar along the bore of the shaft toward the conduit after the sleeve has been expanded into the conduit to block the flow of fluid to increase the spacing between the cutter and intermediate portion of the shaft permitting the expanded sealing sleeve to move to its unexpanded condition; and then retracting the shaft and draw bar in unison along the valve body until the cutter is removed from within the conduit to permit the flow of fluid through said conduit.

* * * * *